UNITED STATES PATENT OFFICE.

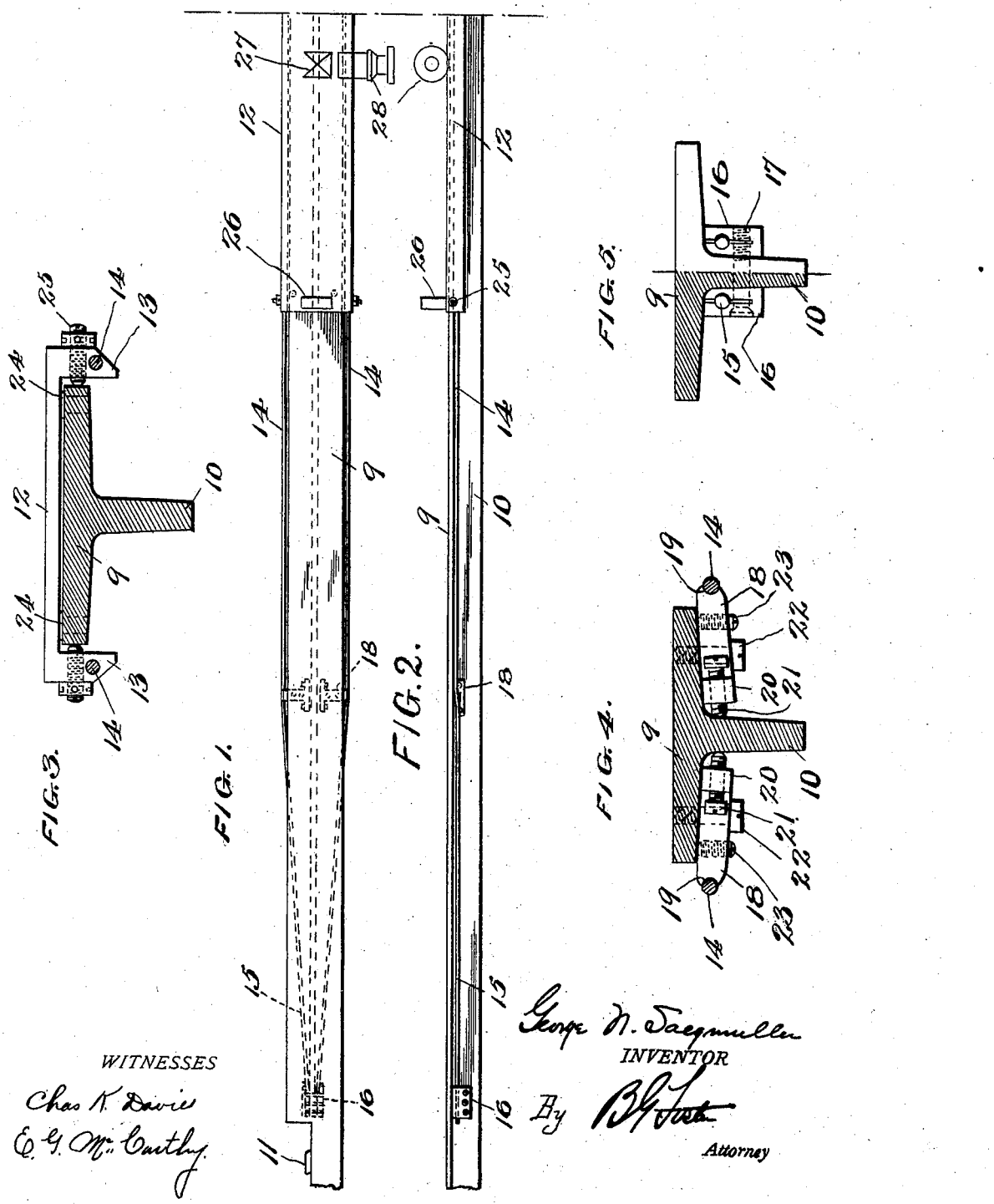

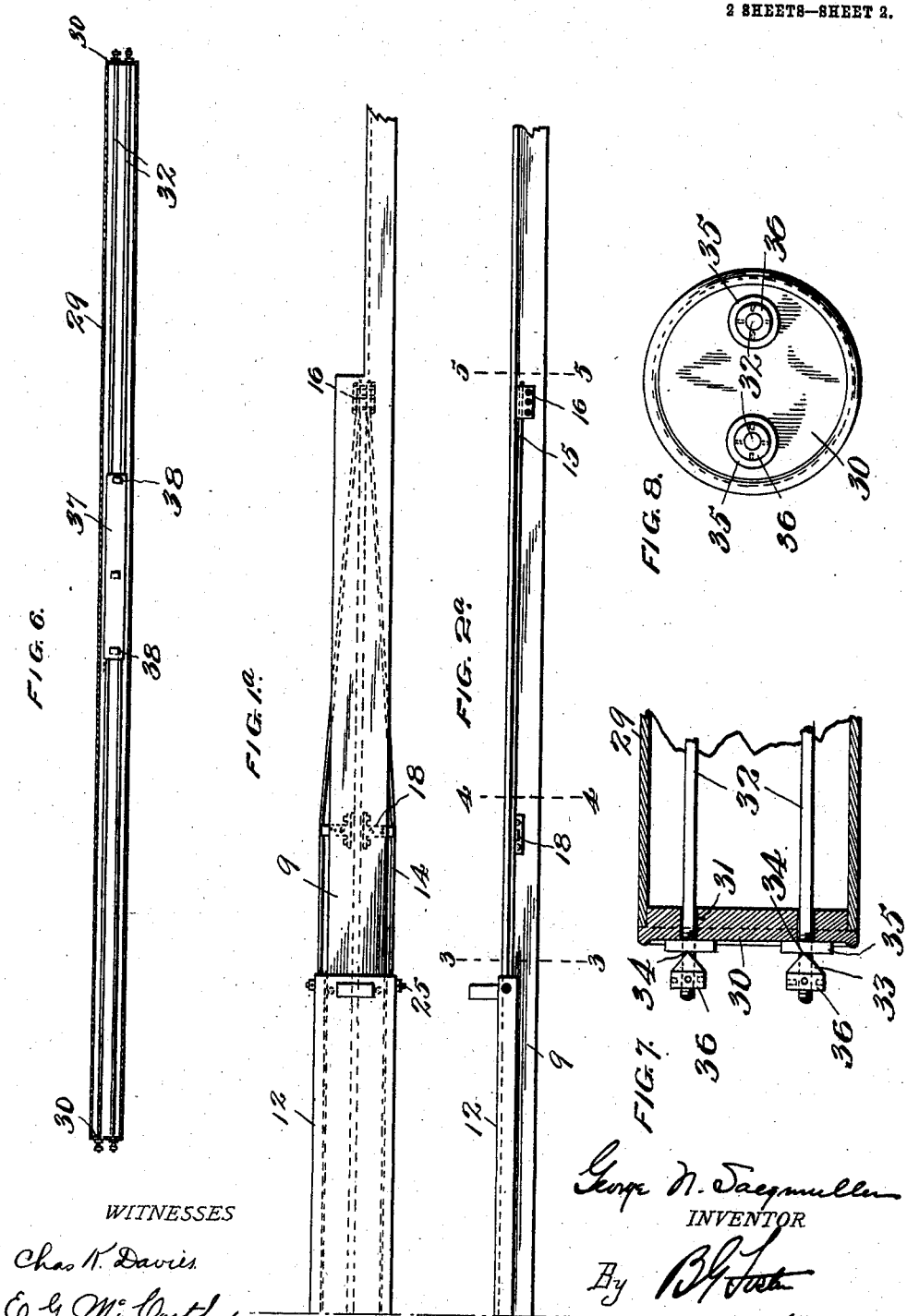

GEORGE N. SAEGMULLER, OF ROCHESTER, NEW YORK, ASSIGNOR TO BAUSCH & LOMB OPTICAL COMPANY, OF ROCHESTER, NEW YORK, A CORPORATION OF NEW YORK.

OPTICAL INSTRUMENT.

963,473.   Specification of Letters Patent.   Patented July 5, 1910.

Application filed February 1, 1910. Serial No. 541,275.

*To all whom it may concern:*

Be it known that I, GEORGE N. SAEGMULLER, a citizen of the United States, residing at Rochester, in the county of Monroe and State of New York, have invented new and useful Improvements in Optical Instruments, of which the following is a specification.

In optical and other instruments of precision, particularly those which are elongated or extended in their character and are subject to changes in temperature, a serious problem is presented in mounting the co-acting parts, so that they will not be influenced by such changes and their accuracy consequently affected. For example in range finders, it is the custom to mount the various optical elements within an inclosing tube or tubular casing constructed of steel or other metal. As there is a possibility that the tube under the influence of the sun's rays will become bent or twisted to some extent, and this bending may influence the support for the optical parts in a similar manner, the relation of the said optical parts may be altered so as to seriously affect the accuracy of the instrument. While this variation will do no particular harm to certain elements of the instrument, the slightest relative change, for instance, between the object glasses, which would throw them out of parallelism, would impair the accuracy of the whole instrument.

One of the primary objects of the present invention therefore is to provide supporting means, which will eliminate the above defect or danger, and in the accompanying drawings, is disclosed a structure, which has proven entirely successful.

In said drawings:—Figure 1 is a plan view of substantially half of the support and Fig. 1ª is a corresponding view of the other half, the inclosing casing being removed in order to avoid confusion. Figs. 2 and 2ª are side elevations of the same. Figs. 3, 4 and 5 are sectional views respectively on the lines 3—3, 4—4 and 5—5 of Fig. 2ª. Fig. 6 is a longitudinal sectional view through another embodiment of the invention. Fig. 7 is a detail sectional view of a portion of the same on an enlarged scale. Fig. 8 is an end view.

Similar reference numerals designate corresponding parts in all the figures of the drawings.

In the present embodiment disclosed in Figs. 1–5 inclusive, instead of mounting the objective glasses, and in fact the whole central apparatus of the instrument on the long supporting base bar which carries the penta prisms, these parts are carried on a separate supporting element, which may have quite a movement laterally on the bar, but to which it is connected by tension rods that are under a very considerable strain. For example, the main base bar, designated 9, which is preferably provided with a central longitudinal reinforcing flange 10, carries at its end, the usual penta prisms 11, and located on this bar between its ends, is a support 12 for the central instrumentalities, this support comprising a substantially flat saddle plate having offset flanges 13 that overhang and embrace the bar. Connected to the ends of said flanges are tension rods 14 having convergently disposed outer ends 15 that are clamped in split clips 16, which clips are secured to the flange 10 of the base bar 9 by screws or other fasteners 17. In order to obtain the necessary tension (about three hundred and fifty pounds), and maintain the rods 14 in proper relation, spreader elements 18 are employed that are interposed between the flange 10 of the base bar and said rods. The outer ends of these elements have seats 19 for the reception of the rods, and they are furthermore provided with outstanding base ears 20, through which are passed adjusting screws 21 that bear against the flange 10. The spreader elements furthermore have longitudinal slots, through which are passed clamping screws 22. Furthermore in order that the said elements 18 can be properly positioned with respect to the body of the bar 9, adjusting screws 23 are passed through said elements and bear against the rear side of the bar. The saddle plate 12 is lightly spaced from the outer surface of the bar by means of bearing heads 24 and the flanges 13 of said plate have adjusting screws 25.

It is the usual custom to construct the base bar 9 of a metal having a comparatively low co-efficient of expansion, the metal usually employed being that known as "Invar", and in the structure disclosed, the tension rods 14 are formed of the same material. The central optical and measuring elements are carried by the central supporting saddle 12. For instance, the objectives are illustrated at 26, the oppositely disposed deflecting prisms are designated 27, and the eye-piece is shown at 28. With this arrangement therefore, although the penta prisms may change their relation, due to the warping of the bar their optical performance will not be affected thereby and it is evident that this will not affect the relation of the object glasses and the parts associated therewith. Consequently any variation of the base bar will not affect the accuracy of the instrument.

In Figs. 6, 7 and 8, another embodiment is disclosed. In this form, the elongated or extended base is a tubular support 29, the ends of which are closed by strong cap disks or plates 30 having openings 31 therethrough. Tension rods 32 of Invar if the tube be Invar or other suitable material extend longitudinally through the tubular support or base and through the openings 31, and are placed under great tension. For example, if a tube of sixteen and one-half feet is employed, the rods may be placed under a tension of one thousand pounds each. Bearings for the ends of the rods are employed that are in the form of washers 33 having knife edge bearings 34 on other washers 35 that abut against the caps, and tension nuts 36 are threaded on the rods and bear against the washers 33. Mounted on these rods at any point desired, are one or more supporting saddles or elements 37, carrying the instrumentalities 38, such as the optical parts. It may also be desirable to apply spiral springs at one end of the rods in order to keep them under continuous tension.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In a structure of the character set forth, the combination with an elongated base member, of tension rods connected at their ends thereto, and an instrument-carrying device connected to the rods.

2. In a structure of the character set forth, the combination with a base, of tension rods placed under strain and connected at one of their two ends to the base, and a support connected to the base by the tension rods.

3. In a structure of the character set forth, the combination with an elongated base, of instrument-supporting means associated therewith and having oppositely extending tension members connected thereto and to the opposite end portions of the base, said tension members being placed under strain.

4. In a structure of the character set forth, the combination with a base, of a supporting element associated therewith, and oppositely extending tension elements connected to the supporting element and base and placed under strain.

5. In a structure of the character set forth, the combination with a base, of a supporting element mounted on the base, oppositely extending tension rods connected to the element, and means connecting the outer ends of the rods to the base.

6. In a structure of the character set forth, the combination with an elongated base, of a supporting element of less length than the base located on the same between its ends, tension rods connected to the supporting element and extending longitudinally of the base, and means for securing the outer ends of the rods to the base.

7. In a structure of the character set forth, the combination with a base, of a supporting element, spaced tension rods connected to each end of the supporting element and to the base, and spreaders bearing against the rods between their ends.

8. In a structure of the character set forth, the combination with an extended base, of a saddle located on the base between its ends, tension rods connected to each end of the saddle and to the base, and spreaders interposed between the base and rods.

9. In a structure of the character set forth, the combination with a flanged base bar, of a saddle support located thereon, and tension rods connected to the ends of the saddle support and to the base bar beyond the same.

10. In a structure of the character set forth, the combination with a flanged base bar, of a saddle support located thereon between its ends, and spaced tension rods connected to the ends of the saddle support and having convergent end portions connected to the base bar.

11. In a structure of the character set forth, the combination with a flanged base bar, of a saddle support located thereon between its ends, spaced tension rods connected to the ends of the saddle support and having convergent end portions connected to the base bar, and spacing elements interposed between the base bar and rods.

12. In a structure of the character set forth, the combination with a flanged base bar, of a saddle located thereon between its ends and having depending flanges that embrace the base bar, tension rods extending longitudinally of the base bar on opposite sides of the same and connected to the ends of the saddle, means for securing said tension rods to the base bar, spreaders interposed between the flange of the base bar and the rods, and means for adjusting said spreaders.

13. In a structure of the character set forth, the combination with a base, of a supporting member mounted thereon, tension rods connected to the base and to the supporting member, and means engaging the tension rods between their ends for placing said tension rods under strain.

14. In a structure of the character set forth, the combination with a base, of a supporting member mounted thereon, tension rods connected to the base and to the supporting member, spreader elements engaging the tension rods between their ends, means for securing the spreader elements to the base, and means for moving said spreader elements transversely of the rods.

15. In a structure of the character set forth, the combination with an extended base, of a support associated with the base, instruments mounted on the support, and means for securing the base and support together, said means permitting the movement of the base with respect to the support, while maintaining said support and the instruments thereon in fixed relation.

16. In a structure of the character set forth, the combination with a base, of a supporting member associated therewith, optical elements mounted on the base beyond the supporting member, other coacting optical elements mounted on the supporting member, and connections between the supporting member and base, said member being placed under a strain that is disposed longitudinally of the base.

17. In a structure of the character set forth, the combination with a base, of optical elements, and means for mounting the elements on the base, including tension members disposed longitudinally of and connected to the base, said members being placed under longitudinal strain.

18. In a structure of the character set forth, the combination with a base, of optical elements, and means for mounting the elements on the base, including spaced tension rods disposed longitudinally of and having end portions connected to the base, said rods being placed under longitudinal strain.

In testimony whereof I have hereunto set my hand in presence of two subscribing witnesses.

GEORGE N. SAEGMULLER.

Witnesses:
  HENRY C. THON,
  DANIEL M. SMITH.